(12) United States Patent
Houwing et al.

(10) Patent No.: US 12,257,777 B2
(45) Date of Patent: Mar. 25, 2025

(54) FUSED FILAMENT FABRICATION SYSTEM WITH INTERCHANGEABLE PRINT HEADS AND FILAMENT

(71) Applicant: Ultimaker B.V., Utrecht (NL)

(72) Inventors: Raymond Houwing, Utrecht (NL); Beerend Groot, Utrecht (NL)

(73) Assignee: Ultimaker B.V., Geldermalsen (NL)

( * ) Notice: Subject to any disclaimer, the term of this patent is extended or adjusted under 35 U.S.C. 154(b) by 267 days.

(21) Appl. No.: 17/917,256

(22) PCT Filed: Apr. 1, 2021

(86) PCT No.: PCT/NL2021/050213
§ 371 (c)(1),
(2) Date: Oct. 6, 2022

(87) PCT Pub. No.: WO2021/215909
PCT Pub. Date: Oct. 28, 2021

(65) Prior Publication Data
US 2023/0173749 A1 Jun. 8, 2023

(30) Foreign Application Priority Data
Apr. 21, 2020 (NL) ..................................... 2025383

(51) Int. Cl.
*B29C 64/209* (2017.01)
*B23Q 3/155* (2006.01)
*B29C 64/118* (2017.01)
*B29C 64/336* (2017.01)
*B33Y 10/00* (2015.01)
*B33Y 30/00* (2015.01)

(52) U.S. Cl.
CPC ........ *B29C 64/209* (2017.08); *B23Q 3/15536* (2016.11); *B23Q 3/15566* (2013.01); *B29C 64/118* (2017.08); *B29C 64/336* (2017.08); *B33Y 10/00* (2014.12); *B33Y 30/00* (2014.12)

(58) Field of Classification Search
CPC ............................ B29C 64/118; B29C 64/336
See application file for complete search history.

(56) References Cited

U.S. PATENT DOCUMENTS 10,464,178 B1   11/2019   Steeb et al.

FOREIGN PATENT DOCUMENTS

WO    2016/057028 A1    4/2016
WO    2017/132767 A1    8/2017

*Primary Examiner* — John J DeRusso
(74) *Attorney, Agent, or Firm* — N.V. Nederlandsch Octrooibureau

(57) ABSTRACT

Provided herein is a fused filament fabrication system having a number of print heads, a print head mount, and a gantry. So-called filament modules can be connected to the print heads. The print heads can be docked into a special print head dock or into one of the filament docks if a filament module is arranged in between. Filament feeders feed filament to the filament modules. A control system controls the gantry to select one print head from the number of print heads. The selected print head can be used for a printing job having the current filament attached, or it can be moved to another filament dock to first pickup a different filament. The selected print head can also be parked to select another print head. Multiple print heads can thus be combined with multiple filaments without user intervention.

14 Claims, 10 Drawing Sheets

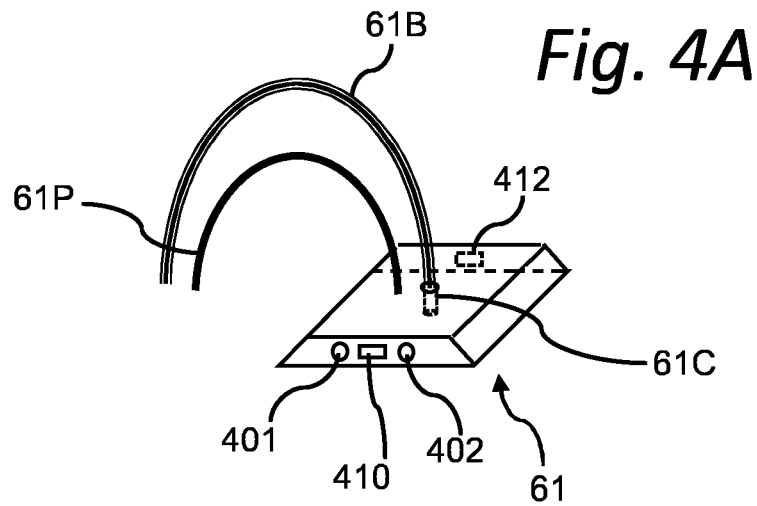
Fig. 4A
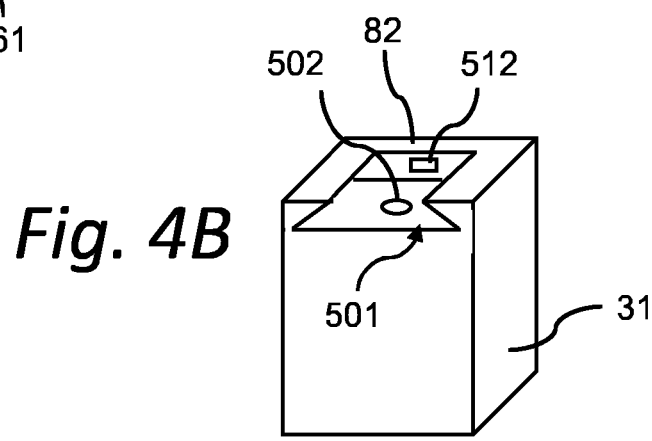
Fig. 4B
Fig. 5A
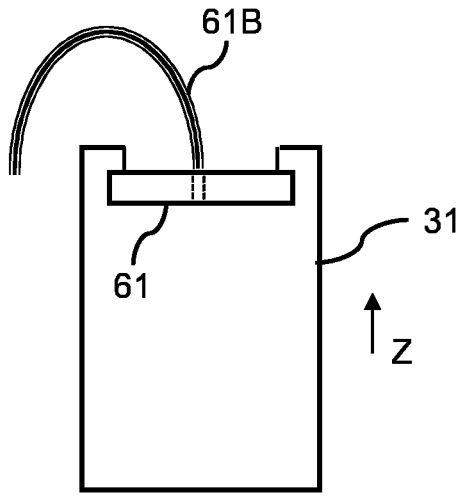
Fig. 5B
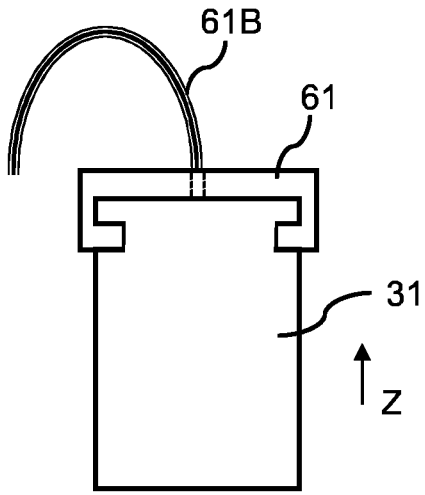

FUSED FILAMENT FABRICATION SYSTEM WITH INTERCHANGEABLE PRINT HEADS AND FILAMENT

FIELD OF THE INVENTION

The present invention relates to a fused filament fabrication (FFF) system and to a method of fused filament fabrication using such an FFF system.

BACKGROUND ART

Fused filament fabrication is a material extrusion type additive manufacturing technique and is currently the most widely used 3D printing technology. FFF systems generally comprise one or more extrusion heads, suitably mounted to allow movement of the extrusion heads in the X, Y and Z directions. It is noted that extrusion heads are also referred to as print heads or deposition heads.

During operation, thermoplastic filament is fed to a print head and heated to a desired temperature so that it melts before it is deposited. By suitably moving the print head relative to a build surface, the filament is deposited in successive layers in predetermined locations.

In the event that a different filament is needed during printing of an object, the currently used filament needs to be retracted from the print head, and a new filament needs to be fed. This is a time-consuming way of working and slows down the process. To make the multiple filament printing process faster, some manufacturers nowadays provide for so-called dual nozzle printers. In such printers two different types of filament can be used, and also two different types of nozzle.

If for some reason, yet another nozzle or filament is needed, the user still needs to interfere, which again will slow down the process. In order to make 3D printing more flexible, printing systems are developed that use multiple print heads and multiple types of filament. Such printing systems may comprise or co-operate with so-called tool changers arranged to automatically change print heads.

US patent publication US 2015/0137401 A1 discloses a head tool changer for use with a deposition-based digital manufacturing system. The head tool changer comprises a tooling unit configured to retain a deposition head, a grip unit configured to engage with tooling unit and to relay electrical power to the tooling unit, and a master unit operably mounted to a gantry and configured to engage with the tooling unit and to relay electrical power to the tooling unit. Each of the deposition heads may comprise an extrusion tip (i.e. a nozzle) connected to a filament guide tube, wherein the guide tube may be fed with filament. The filament guide tube is connected to the deposition head. Prior to building a 3D model or support structure, a tool changer controller may initialize (e.g., warm up and purge) one or more of deposition heads for use in the printing system. Once a deposition head has been warmed up, it is placed by the grip unit into the master unit which takes over the control and powering of the print head. Since a selected print head has been warmed up before it was put into the master unit, time can be saved as compared to systems that do not heat up the print heads in their parking locations. However, to be able to achieve this time saving, the system requires an electrical power relay through each grip unit and also through the gantry. Similarly, the system requires control cables through each grip unit and also through the gantry. This makes the system rather complex and prone to malfunctioning. Furthermore, since each print head is connected to one filament guide tube, a change of filament for a specific print head cannot be performed automatically.

SUMMARY OF THE INVENTION

The present invention aims to provide an improved fused filament fabrication system that solves at least some of the problems of the above-mentioned prior art.

According to a first aspect, there is provided a fused filament fabrication system comprising a build surface, a number of print heads, wherein each print head comprising an extrusion channel and a nozzle at the end of the extrusion channel. A print head mount is arranged for releasable connection with any of the print heads. A gantry is arranged to move the print head mount relative to the build surface in an X, Y and Z direction.

The system further comprises a number of filament modules each of which comprising a filament channel for passing through of a filament, and arranged to be releasably connected to a respective one of the print heads, wherein in a connected configuration, the filament channel is aligned with the extrusion channel. The system also comprises a number of filament docks each of which arranged for docking one of the filament modules, and a print head dock arranged for docking any of the print heads. The system also comprises a number of filament feeders, each of the filament feeders being connected via a Bowden tube to a respective one of the filament modules and configured for feeding the filament to the respective one of the filament modules.

A control system is arranged to control the gantry so as to select one print head from the number of print heads, to obtain a selected print head. Each of the print heads can be docked in the print head dock, and alternatively, via one of the filament modules, in any of the filament docks, wherein, starting from a parking state in which the selected print head is docked in one of the filament docks via a currently attached filament module, the selected print head together with the currently attached filament module can be separated from the filament dock by way of locking the selected print head to the currently attached filament module, by coupling the selected print head to the print head mount, and by then moving the selected print head away from its corresponding filament dock. Or the selected print head can be separated from the currently attached filament module by way of unlocking the selected print head from the currently attached filament module, by coupling the selected print head to the print head mount, and by then moving the selected print head away from its corresponding filament dock.

The present invention provides for a fused filament fabrication system which allows for interchanging print heads and filaments. The FFF system allows for improved flexibility to switch filaments for a specific print head or to switch print heads for a specific filament. Moreover, the FFF system allows for full automation of interchanging filaments and print heads, thereby simplifying the setup, configuration and the speed at which the FFF system is able to print 3D objects utilizing various filaments and print heads types.

In an embodiment, the selected print head gets locked to the currently attached filament module by a filament fed through the currently attached filament module and at least partially into the extrusion channel of the selected print head. By feeding the filament through the filament module and also at least partly into the extrusion channel of the print head, the two are fixed in two direction perpendicular to a main axis of the extrusion channel. The filament can be fed by means of the feeder that is arranged between the filament supply and the filament module. Unlocking is possible by sufficiently retracting the filament out of the extrusion channel of the print head. By using the filament to lock the modules, no additional locking mechanism is needed.

In an embodiment, the selected print head gets locked to the currently attached filament module by way of a locking mechanism arranged in each of the filament modules and/or each of the print heads. An advantage of an additional or alternative locking mechanism is that locking is possible independent of the filament feeding. The locking mechanism may comprise e.g. a resilient lock and/or an electromechanical lock controlled by the control system.

In an embodiment, the number of the filament modules is equal to the number of filament docks. In this way all the filament docks are used for docking of a filament module supplying a specific filament. In this way the number of different filaments is optimized.

In an embodiment, the number of print heads is equal to the number of filament docks. Since the system also comprises a print head dock, all the filament docks can be filled with filament modules and print heads, without obstructing the process of mixing and matching the filaments with the print heads.

In an embodiment, the print head dock comprises a further filament dock and a further filament module. In this embodiment, the print head dock not only functions as a parking place for a print head during the selection process, but additionally it also functions as a dock for an additional filament module. So, the number of different types of filament can be increased by one, without taking up additional space.

In an embodiment, the system comprises a print head exchange dock arranged to connect to the selected print head, remove the selected print head from the print head mount, and to present the selected print head to a user for removal of the selected print head from the system. The print head exchange dock enables the manual insertion, replacement and removal of a print head. The print head exchange dock can also function as the print head dock.

In an embodiment each of the filament modules is provided with a print head power supply cable, and wherein each filament module comprises a releasable electrical connection to provide power to a connected print head. So, filament module will supply a filament to a connected print head together with power. Therefore, the print head itself does not require its own power supply cabling. There will be no need for a power supply via the mount and gantry, as was the case in the prior art.

In an embodiment, each of the print heads comprises a recess arranged to slidably receive one of the filament modules. Sliding can be done in a direction perpendicular to the Z-direction, such as the X-direction. This is convenient since the gantry is already arranged to move in that direction for printing tasks. So, a print head, with or without filament module, can be taken out of the dock using the gantry, and no additional gantry is needed for providing the print heads.

In an embodiment, the system comprises a number of lifting modules, each being arranged to lift one of the filament docks or the print head dock. Lifting of the docks will provide for lifting of the attached print heads. This has several advantages. If a print head can be lifted, it will free up space in the build chamber. Furthermore, a print head can be lifted in and out of the print head mount which enables the design of the print head mount. Finally, the lifting of the print head is advantageous if the print head mount is surrounded by e.g. bellows which seal a heated build chamber.

In an embodiment, nozzles of at least two of the print heads have different nozzle outlet diameters. This enables the system to print with different nozzle sizes which then can be combined with different filament types. This will provide for a variety of print tasks possible. It is noted that all the print heads may have their own nozzle size so as to maximize the possibilities for selecting the proper print head (and nozzle).

In an embodiment, at least one of the print heads comprise a further filament feeder. This further filament feeder can be arranged inside the print head to function as a so-called direct feeder. Control of the direct feeder can be executed in the control system via the cable connected to the attached filament module. The control system can be arranged to align the control of the prefeeder and the direct feeder. Alignment may comprise synchronising feeding actions and/or handing over control to one feeder to the other.

In an embodiment, at least one of the filament modules comprises a yet further filament feeder. This yet further filament feeder may act as the direct feeder in case a direct feeder is preferred and there is no feeder in the print heads.

The invention also relates to a method of fused filament fabrication. The method comprises the following:
providing a fused filament fabrication system as described above;
placing the print heads and the filament modules in the corresponding filament docks;
feeding one or more filaments to the filament modules by means of the filament feeders;
moving the gantry so that the print head mount is able to mount with a selected print head.

If the filament module that is attached to the selected print head is fed with a wanted filament, then the following is performed:
locking the selected print head to the attached filament module;
taking the selected print head with the attached filament module from the filament dock.

If the filament module that is not attached to the selected print head is fed with a wanted filament, then the following is performed:
unlocking the selected print head from the attached filament module;
placing the selected print head into the print head dock;
taking the print head that is currently attached to the filament module having the wanted filament, and placing that print head into a filament dock without a docked print head;
placing the selected print head into the filament dock with the filament module having the wanted filament;
locking the selected print head to the filament module having the wanted filament,
taking the selected print head with the attached filament module from the filament dock.

SHORT DESCRIPTION OF DRAWINGS

These and other aspects of the invention are apparent from and will be elucidated with reference to the embodiments described hereinafter. In the drawings, FIG. 1 schematically shows a fused filament fabrication device according to an embodiment of the present invention;

FIG. 2 shows a schematic top view of the fused filament fabrication system of FIG. 1;

FIG. 3 schematically shows the print head after having picked up the filament module from filament dock;

FIG. 4A schematically shows a perspective view of the filament module according to an embodiment;

FIG. 4B schematically shows a perspective view of the print head according to an embodiment;

FIG. 5A schematically shows a cross section of an assembly of a print head and a filament module according to a further embodiment;

FIG. 5B schematically show a cross section of an assembly of a print head and a filament module according to a further embodiment;

FIG. 6 schematically shows a side view of the print head placed in a so-called parking state;

FIG. 7 schematically shows the print head and the filament module being in the same parking state as in FIG. 6 but now the filament is fed into the print head;

Figure 13:
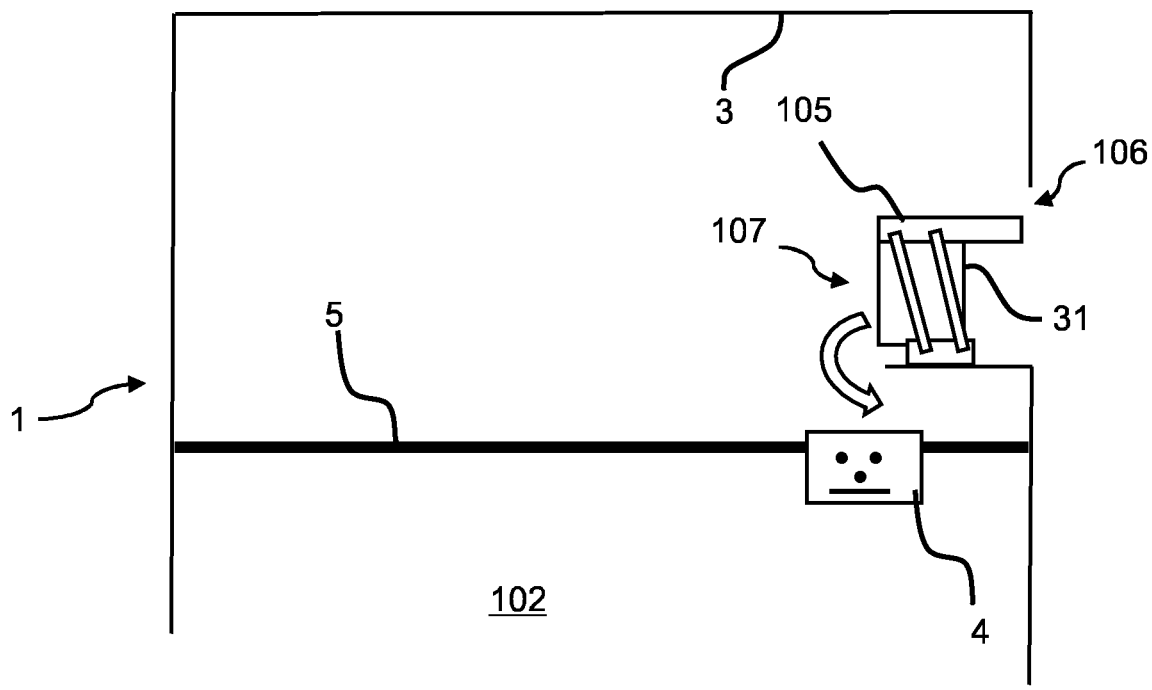
Figure 14:
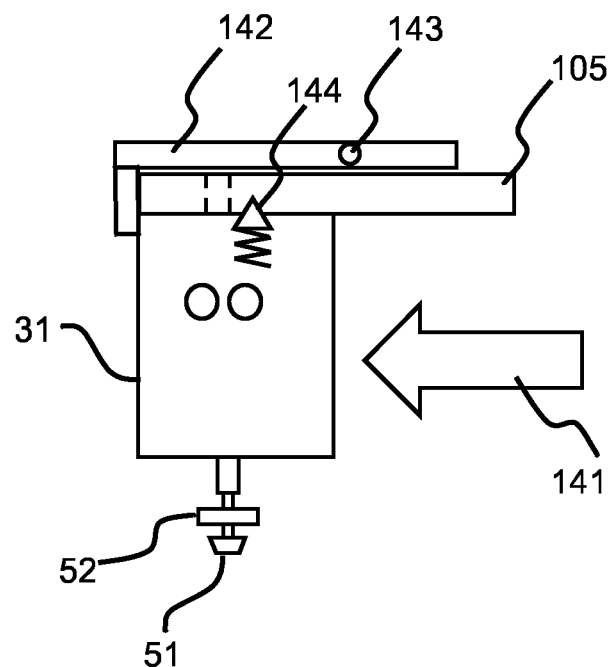
Figure 15:
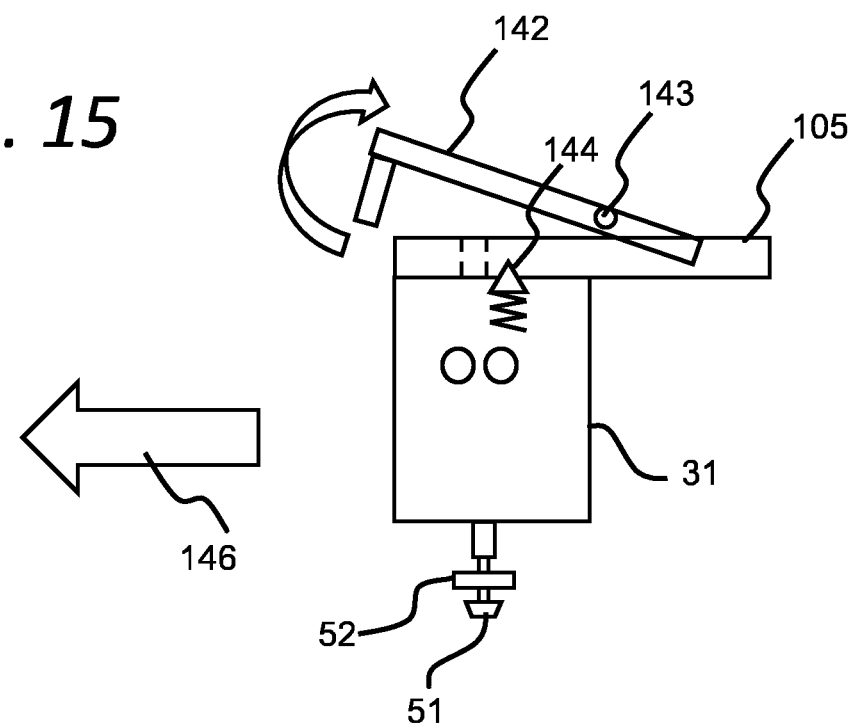
Figure 16:
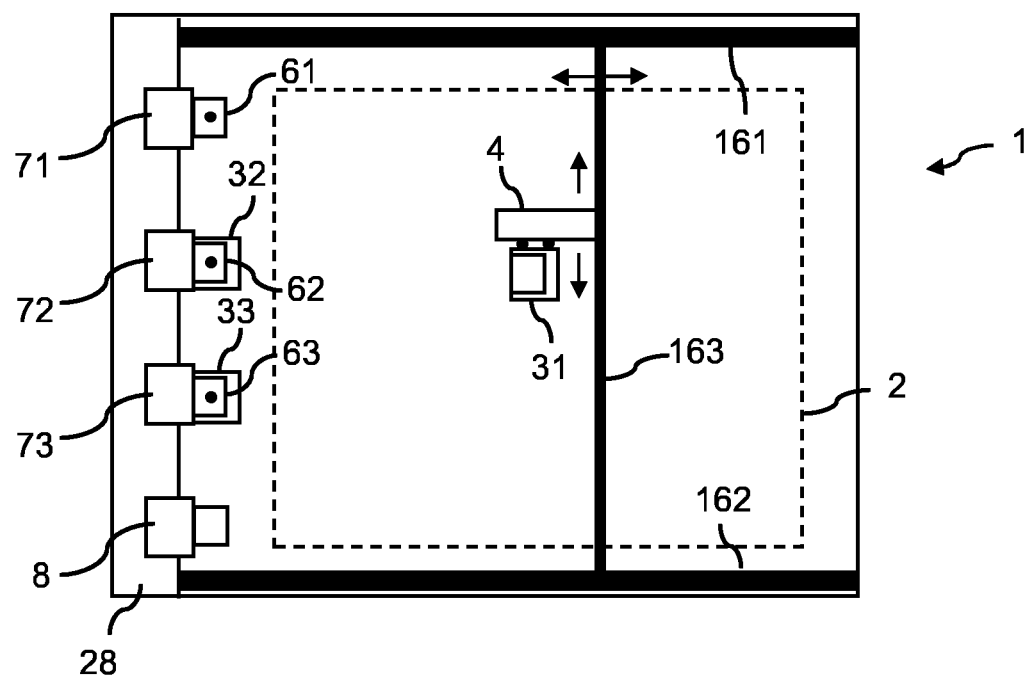
Figure 17:
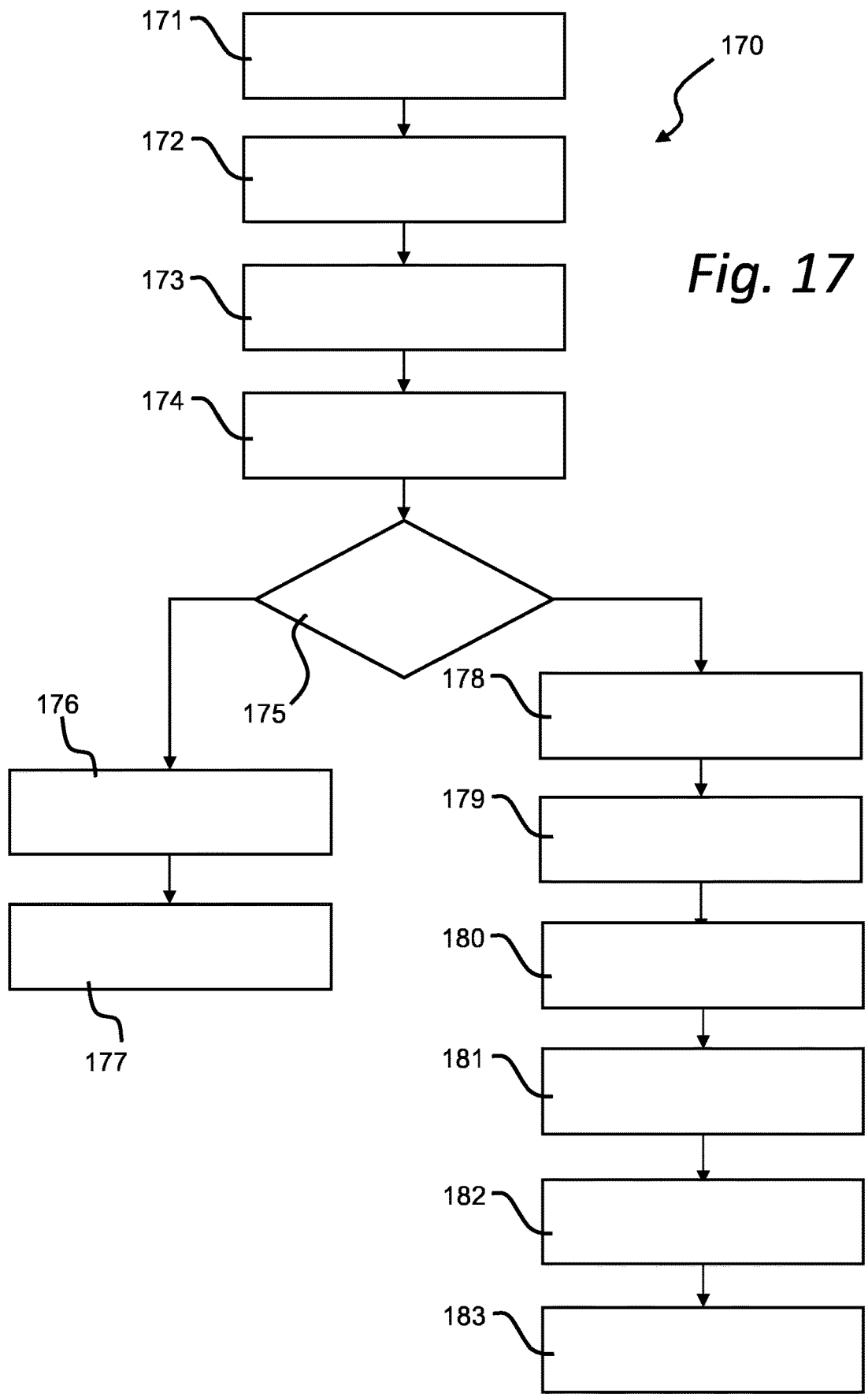

FIG. 13 which shows a schematic side view of part of the FFF system according to an embodiment;

FIG. 14 schematically shows a side view of an assembly of a print head attached to the print head exchange dock;

FIG. 15 schematically shows a side view of an assembly of a print head attached to the print head exchange dock;

FIG. 16 shows a top view of the FFF system according to a further embodiment wherein the print head mount is manoeuvred by means of a rail system with two static rails and one moving rail, and FIG. 17 shows a flow chart of a method of fused filament fabrication according to an embodiment of the invention.

It should be noted that items which have the same reference numbers in different Figures, have the same structural features and the same functions, or are the same signals. Where the function and/or structure of such an item has been explained, there is no necessity for repeated explanation thereof in the detailed description.

DESCRIPTION OF EMBODIMENTS

Figure 1:
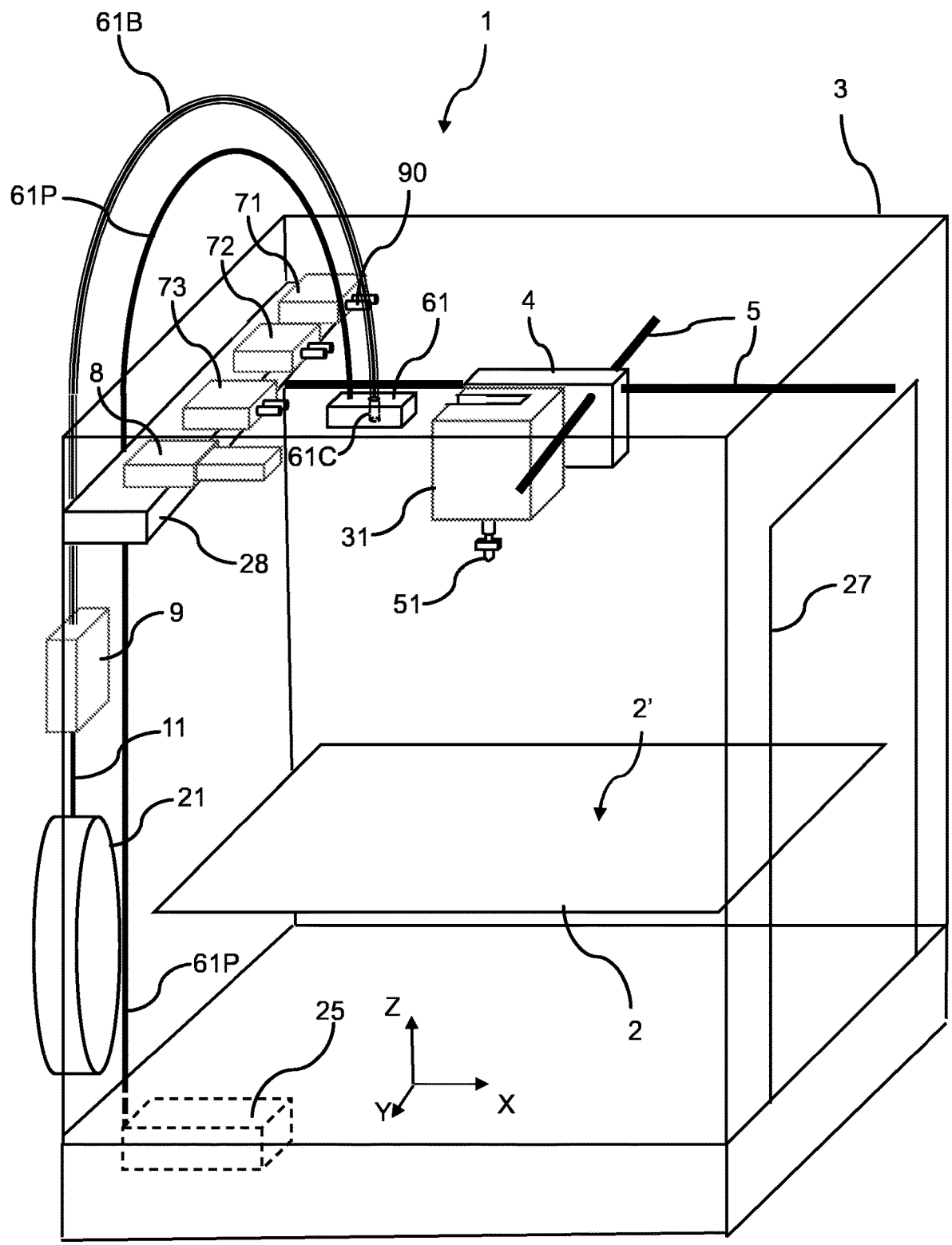

FIG. 1 schematically shows a fused filament fabrication device 1 according to an embodiment of the invention. The fused filament fabrication system 1 comprises a build plate 2 which is moveably arranged in a housing 3 of the system 1. The system 1 comprises a number of print heads 31, only one of which is shown in FIG. 1. Each print head 31 comprises an extrusion channel (not visible in FIG. 1) and a nozzle 51 at the end of the extrusion channel. Furthermore, the print head 31 comprises a heating element 52 arranged to heat part of the extrusion channel, sometimes referred to as melt chamber. A print head mount 4 is arranged for releasable connection with any of the print heads 31.

A gantry 5 is arranged to move the print head mount 4 relative to the build surface 2' of the build plate 2 in an X, Y and Z direction. The gantry 5 is a guide rail system that is desirably configured to move the print heads 31 in a horizontal X-Y plane within build chamber based on signals provided from a control system 25. The horizontal X-Y plane is a plane defined by an X-axis and a Y-axis, where the X-axis, the Y-axis, and the Z-axis are orthogonal to each other. In an alternative embodiment, build plate 2 may be configured to move along two axes within the housing 3 (e.g., X-Z plane or the Y-Z plane), and the loaded print head 31 may be configured to move along a single horizontal axis (e.g., the X-axis or the Y-axis). Other similar arrangements may also be used such that one or both of the build plate 2 and the loaded print head 31 are moveable relative to each other. Also, the build plate 2 may be replaced by a conveyer belt which comprises the build surface 2'.

The system 1 further comprises a number of filament modules 61 only one of which is shown in FIG. 1. Each of the filament modules 61 comprises a filament channel 61C for passing through of a filament 11. The filament modules 61 are arranged to be releasably connected to a respective one of the print heads 31, wherein in a connected configuration, the filament channel 61C is aligned with the extrusion channel of the print head 31, as will be explained in more detail below.

The system 1 further comprises a number of filament docks 71,72,72 each of which arranged for docking one of the filament modules 61. Furthermore, a print head dock 8 is arranged in the system for docking any of the print heads 31. Each of the filament docks 71,72,73 comprises two pins 90 which can interact with two recesses in the filament module 61. In this way, a filament module, such as the filament module 61, can be releasably connected to a filament dock, such as filament dock 71, or one of the others. It is noted that other types of male/female couplings are conceivable.

In this embodiment, at a back side of the system 1, a number of filament feeders 9 is arranged, each of the filament feeders being connected via a Bowden tube 61B to a respective one of the filament modules 61 and configured for feeding the filament 11 to the respective one of the filament modules 61. For reasons of simplicity only one of the feeders and Bowden tubes is shown in FIG. 1. The filament 11 is retrieved from a filament storage 21. Each filament feeder 9 may comprise a housing, a channel, one or more idle wheels, one or more feeder wheels and an actuator for driving the feeder wheels. Alternatively, some or all of the filament feeders 9 may be part of a feeder system (not shown) which comprises multiple parallel channels but only one common actuator that is arranged to feed one of the filaments at a time by way of using a selector. The selector may comprise an arrangement that selectively presses filament onto the feeder wheel(s) by way of moving and removing idle wheels onto the filament. Such a feeder system will have a number of filament inputs and the same number of outputs which will then be connected by Bowden tubes to the respective filament modules 61.

Each of the filament modules 61 is provided with a respective print head power supply cable 61P, and comprises a releasable electrical connection (see e.g. number 412 in FIG. 4A) to provide power to the connected print head 31. The power supply cable 61P may be connected to a power source that can be arranged in the control system 25 or separate from the control system 25.

It is noted that from FIG. 1 it seems that the filament module 61 is floating in air, whereas in practice the filament module 61 is attached to the print head 31 and/or docked into one of the filament docks 71,72,73.

In this embodiment, the system 1 comprises a control system 25 arranged to control the gantry 5 so as to select one print head from the number of print heads, to obtain a selected print head 31. The control system 25 may be arranged internal or external of the system housing 3. Part or all of the control system 25 may also be located remote from the housing 3.

FIG. 1 shows an opening 27 for giving access to the build plate 2. It is noted that in this example the housing 3 is open at the top, but a further closure can be arranged on top to seal off the build chamber completely. In this example the system 1 also comprises a bar 28 to support the filament docks 71,72,73 and the print head dock 8. The bar 28 may be fixed in the housing 3, but alternatively it may be movably arranged within the housing 3. In an embodiment, the bar 28 can be moved in the X-direction and/or the Z-direction.

Figure 2:
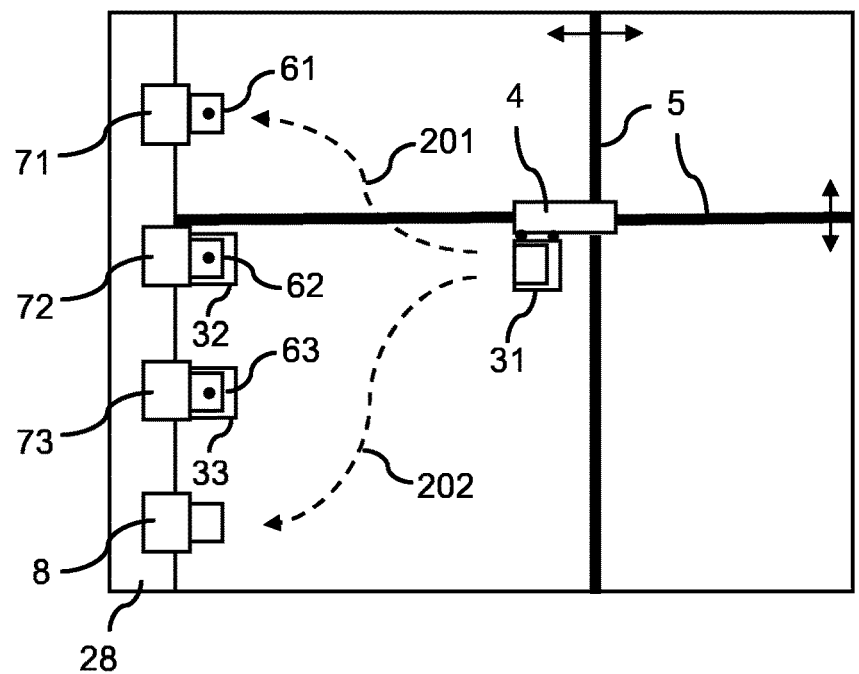

FIG. 2 is a schematic top view of the embodiment of FIG. 1. In FIG. 2, three filament module 61,62,63 are present, each of them docked in a corresponding filament dock 71,72,73. Also three print heads 31,32,33 are shown. Each of the print heads 31,32,33 can be docked in the print head dock 8, and alternatively, via one of the filament modules 61,62,63, in any of the filament docks 71,72,73. Docking of the print heads in these filament docks is possible since a print head can be attached to a filament module, which again can be attached to a filament dock.

FIG. 2 in fact shows a switching state wherein the first print head 31 is mounted onto the print head mount 4 without having a filament module attached. As can be seen from FIG. 2, the print head 32 and the print head 33 are docked in the filament docks 72, 73, respectively.

If the current print head 31 needs to be used in combination with a filament present in the filament module 61, then the control system 25 will operate the gantry 5 in such a way that the print head 31 attached to the print head mount 4 is moved to the filament dock 71, see arrow 201.

If another print head, such as print head 32, needs to be used, then the control system 25 will operate the gantry 5 in such a way that the print head 31 attached to the print head mount 4 is moved to the print head dock 8, see arrow 202.

Figure 3:
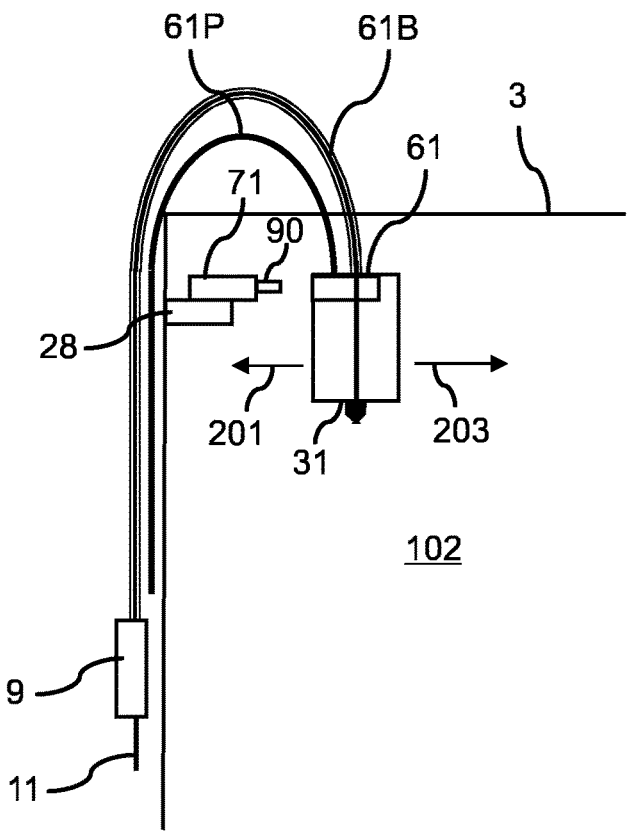

FIG. 3 schematically shows the print head 31 after having picked up the filament module 61 from filament dock 71. The arrow 201 indicates the docking action as was shown in FIG. 2, and the arrow 203 indicates the undocking action. Before the undocking action, the filament module 61 is locked onto the print head 31. Due to this locking the filament module 61 stays attached to the print head 31 during the retraction by the gantry. In an embodiment this locking is achieved by feeding the filament though the filament module 61 and, at least partly, into the extrusion channel of the print head 31 as will be explained in detail below. In FIG. 3, reference 102 indicates the build chamber.

FIG. 4A schematically shows a perspective view of the filament module 61 according to an embodiment. In this embodiment, the filament module 61 comprises a wedge-shaped body having a through hole which is referred to as the filament channel 61C. Two recesses 401, 402 are arranged in the wedge-shaped body to receive the pins 90 of the filament dock 71. The filament module 61 may also comprise a magnetic coupling 410 arranged to connect the filament module 61 to the filament dock 71. For that purpose, the filament dock 71 may comprise a ferromagnetic side wall or a suitably placed magnetic coupling part cooperating with the magnetic coupling 410. The magnetic coupling should be strong enough to retain the filament module 61 when an attached print head 31 is retracted from the filament dock 61 in the unlocked state. On the other hand, the magnetic coupling should be weak enough to let go of the filament module 61 when an attached print head 31 is retracted from the filament dock 61 in the locked state.

The filament module 61 may also comprise a releasable electric coupling 412 arranged to relay power to the attached print head 31 (see also number 512 in FIG. 4B). Power is supplied via the power cable 61P into the filament module 61 and through the electrical coupling 412 to the print head 31. The same may account for control signals coming from the control system 25 and going to the print head 31 or vice versa.

FIG. 4B schematically shows a perspective view of the print head 31 according to an embodiment. In this embodiment, the print head 31 comprises a box shaped main body having a wedge shaped recess 501 at the top which extends from a docks facing side (i.e. the front side in FIG. 4B) until a ridge 82 that is arranged at the top side of the print head 31. The print head 31 comprises an extrusion channel with an entrance 502 as indicated in FIG. 4B. The print head 31 comprises a nozzle which is not shown in FIG. 4B. In the event that the print head 31 is moved towards the filament dock 71 having the filament module 61 of FIG. 4B docked therein, the filament module 61 is sliding in the recess 501 of the print head 31. If the print head mount 4 is disconnected from the print head 31 and moved away from the print head 31, the print head 31 will not fall down. This is due to the fact that a vertical movement is prevented because the wedge shaped filament module body is wider at the bottom as compared to its top part.

FIG. 5A schematically shows a cross section of an assembly of a print head 31 and a filament module 61 according to a further embodiment. In this embodiment, the filament module 61 has a rectangular cross section which co-operates with a rectangular shaped recess in the top of the print head 31. FIG. 5B schematically show a cross section of an assembly of a print head 31 and a filament module 61 according to a further embodiment. In this embodiment, the filament module 61 has a C-shaped cross section which provides for sufficient support of the print head in case the print head 31 is parked in the filament dock 71 without being supported by the print head mount 4.

Figure 6:
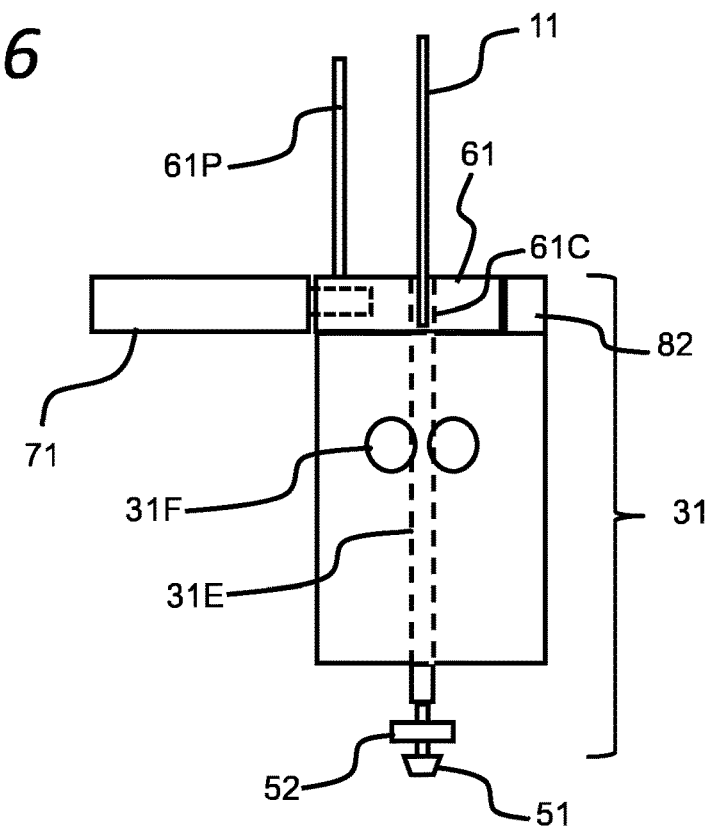

FIG. 6 schematically shows a side view of the print head 31, also referred to as the selected print head 31, placed in a so-called parking state. In this parking state the selected print head 31 is docked in one of the filament docks 71 via the filament module 61 that is currently attached to the print head 31. The print head 31 comprises an extrusion channel 31E and in this embodiment also a feeder 31F. Since the feeder 31F is arranged directly within the print head 31, this feeder is referred to as the direct feeder 31F whereas the feeder 9 feeding the filament to the print head (see FIG. 1) via the Bowden tube 61B (see also FIG. 3) is then referred to as the prefeeder 9. As can be seen from FIG. 6, the filament 11 if fed into the filament module 61 but not into the print head 31.

Figure 7:
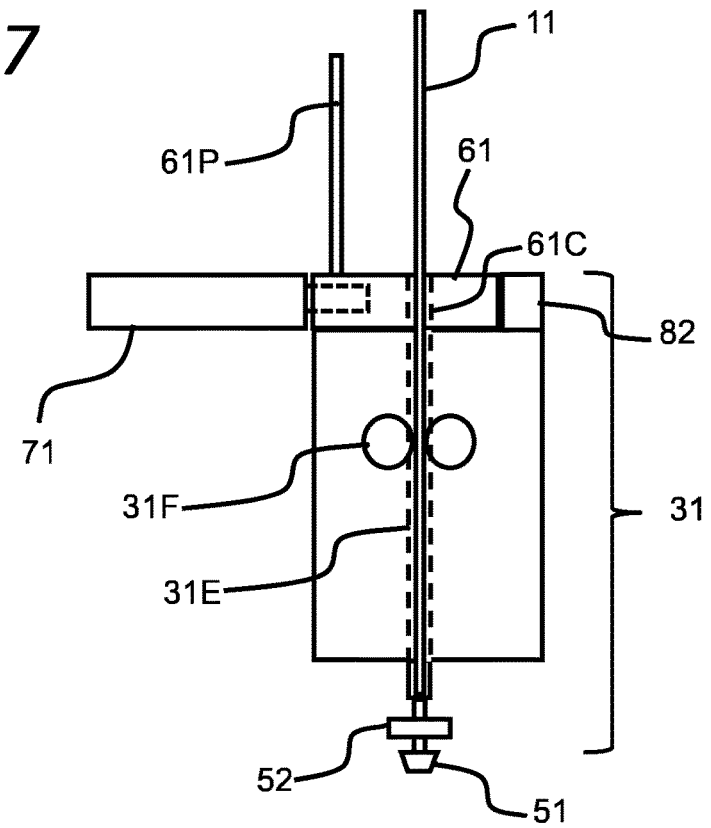

FIG. 7 schematically shows the print head 31 and the filament module 61 being in the same parking state as in FIG. 6 but now the filament 11 is fed into the print head 31, i.e. through the extrusion channel 31E of the print head 31. In order to be able to print, the filament 11 is fed all the through to the nozzle 51 from where it is deposited onto the build plate 2.

Figure 8:
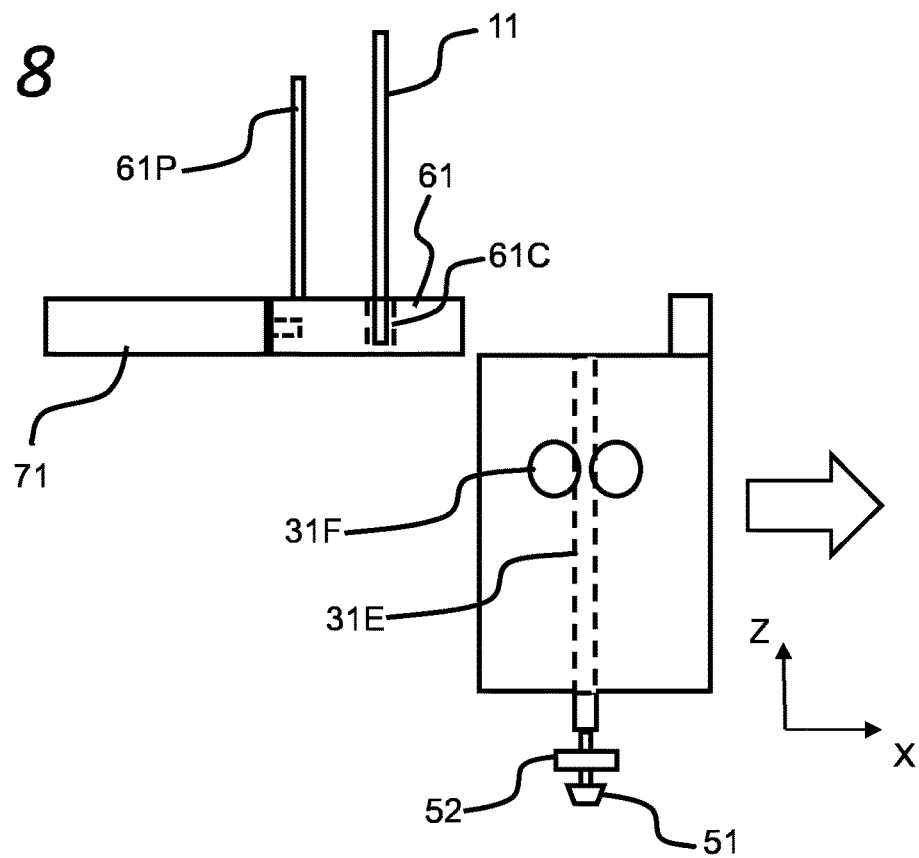
FIG. 8 shows a schematic side view of a part of the FFF system wherein the print head is separated from the currently attached filament module.

Starting from the parking state shown in FIG. 6, the print head 31 can be moved away from the filament dock 71 in the X-direction, see FIG. 8. Since the filament 11 is not (yet) fed into the extrusion channel 31E, it will not prevent the movement of the print head 31 relative to the filament module 61. FIG. 8 schematically shows that the print head 31 is separated from the currently attached filament module 61. The filament module 61 will stay docked in the filament dock 71. To avoid that the filament module 61 erroneously follows the print head 31 in the X-direction due to friction, a coupling force between the filament module 61 and the filament dock 71 can be increased by using e.g. magnetic couplings 410 as shown in FIG. 4A.

Figure 9:
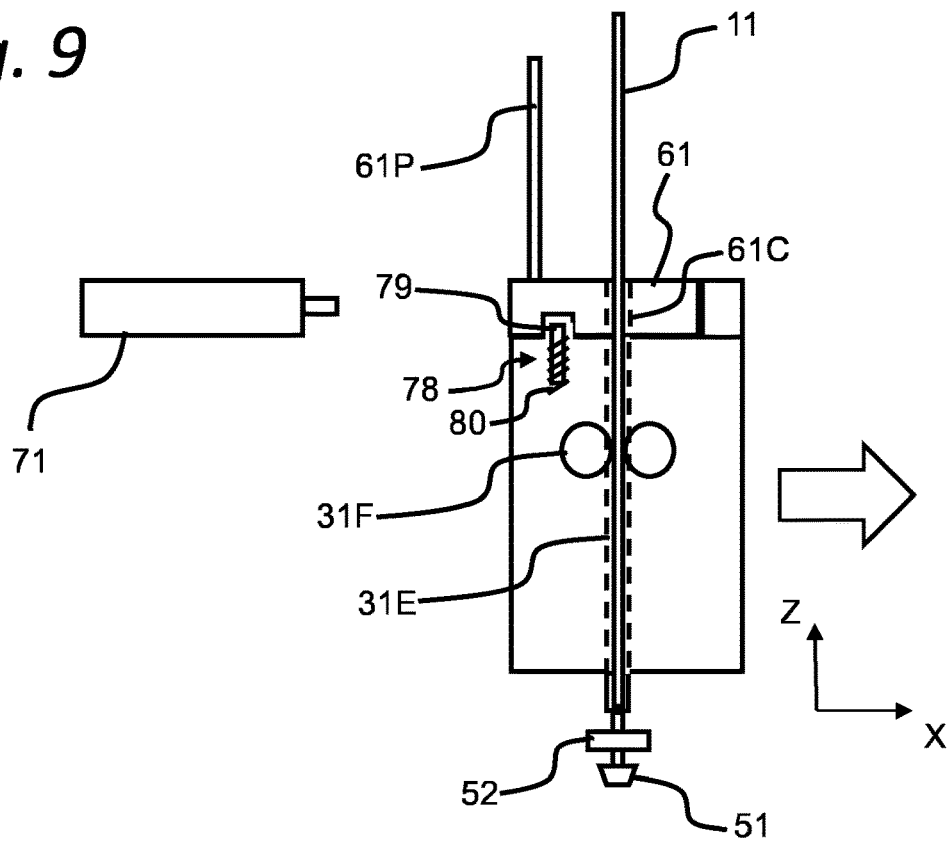
FIG. 9 shows a schematic side view of a part of the FFF system wherein the print head is separated from the filament dock taking along the currently attached filament module.

Starting from the parking state shown in FIG. 7, the print head 31 can be moved away from the filament dock 71 in the X-direction, see FIG. 9. Since the filament 11 is now fed into the extrusion channel 31E, it will prevent the movement of the print head 31 relative to the filament module 61. FIG. 9 schematically shows that the print head 31 is separated from the filament dock taking along the currently attached filament module 61. The filament 11 locks the filament module 61 to the print head 31 at least in the X-direction.

It is noted that different types of filament can be used for the above described method. The filament 11 can have different diameters, such as 2.85 mm or 1.75 mm, and may be manufactured from different materials such as ABS, PLA, PVA, PC or any other type of material suitable for FFF. Such materials and diameters all provide for sufficient strength to be able to lock the filament module 61 to the print head and overcome possible counter forces originating from the magnetic couplings 410 or from friction between the recesses 401,402 in the filament module 61 and the pins 90 of the filament dock 71, see also FIG. 3.

Additionally, or alternatively, the locking of the filament module 61 to the print head 31 may be achieved using a locking mechanism arranged in the filament module 61 and/or the print head 31. FIG. 9 shows an example of a locking mechanism 78. It is noted that this locking mechanism 78 is not shown in FIGS. 6-8. The locking mechanism 78 may comprise a ferromagnetic plunger 79 slidably arranged inside a solenoid 80. The solenoid 80 can be controlled by signals received via the cable 61P from the control system 25. In this example, the plunger is received in a recess arranged in the filament module 61. It is noted that the locking can be done the other way around wherein a recess in arranged in the top of the print head 31. Other locking mechanisms are conceivable such as electromagnetic couplings that do not have any moving parts. It is noted that the locking mechanism 78 can support the filament at its locking function, meaning the locking mechanism 78 locks the filament module 61 to the print head 31 only in those situations wherein the filament also locks the mentioned modules. Alternatively, the locking mechanism 78 can perform the locking function by its own.

Figure 10:
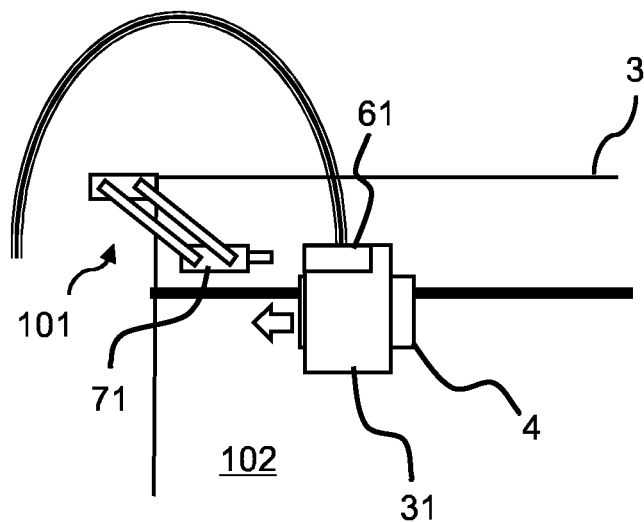
FIG. 10 shows a schematic side view of a part of the FFF system with the print head mounted in the print head mount and approaching a filament dock.

FIG. 10 shows a schematic side view of a part of the FFF system with the print head 31 mounted in the print head mount 4. The print head 31 is attached to one of the filament modules 61 and moved towards one of the filament docks 71. In this embodiment, the fused filament fabrication system 1 comprises a number of lifting modules 101, each being arranged to lift one of the filament module docks, such as filament dock 71 or the print head dock 8 shown in FIGS. 1 and 2. In this example, the lifting modules 101 are arranged at a top corner of the housing 3. The lifting modules 101 are also referred to as lifting arrangements 101. It is noted that the power cable leading to the filament module 61 is not shown in this figure. It should be noted that the housing 3 comprises on opening at the top in order to give way for the actions of the lifting module 101. The housing 3 may have an even larger enclosure that is dimensioned so as to enclose the Bowden tubes and also the lifting modules 101.

Figure 11:
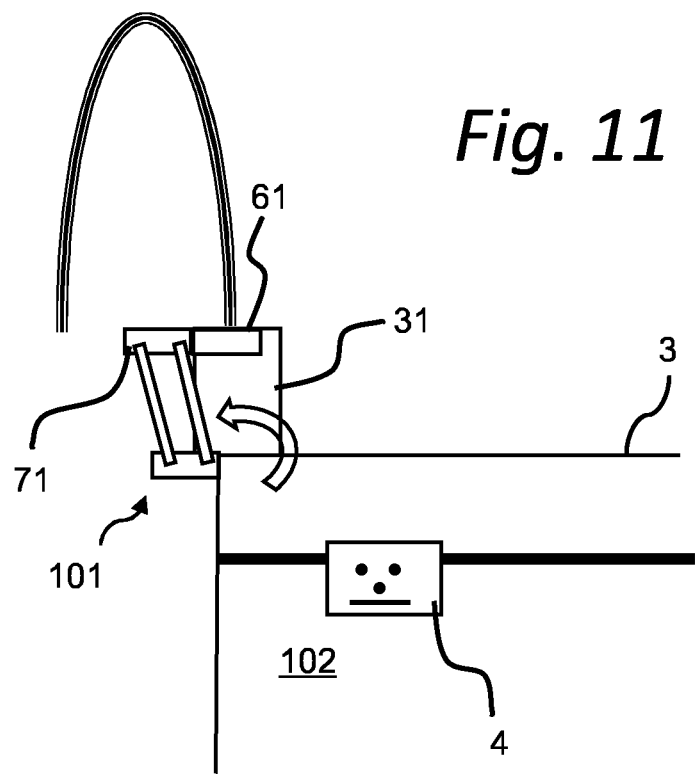
FIG. 11 shows the system in the situation wherein the print head is lifted by means of the lifting module and brought to a location out of the build chamber.

FIG. 11 shows the system in the situation wherein the print head 31 is lifted by means of the lifting module 101 and brought to a location out of the build chamber 102. By removing the print head 31 from the build chamber 102, more space is available to move the gantry for printing objects. As can be seen from FIG. 11, the print head mount 4 comprises a kinematic mount arranged to couple the print head 31 in a way appreciated by the skilled person. Other types of couplings are conceivable and known from the art.

Figure 12:
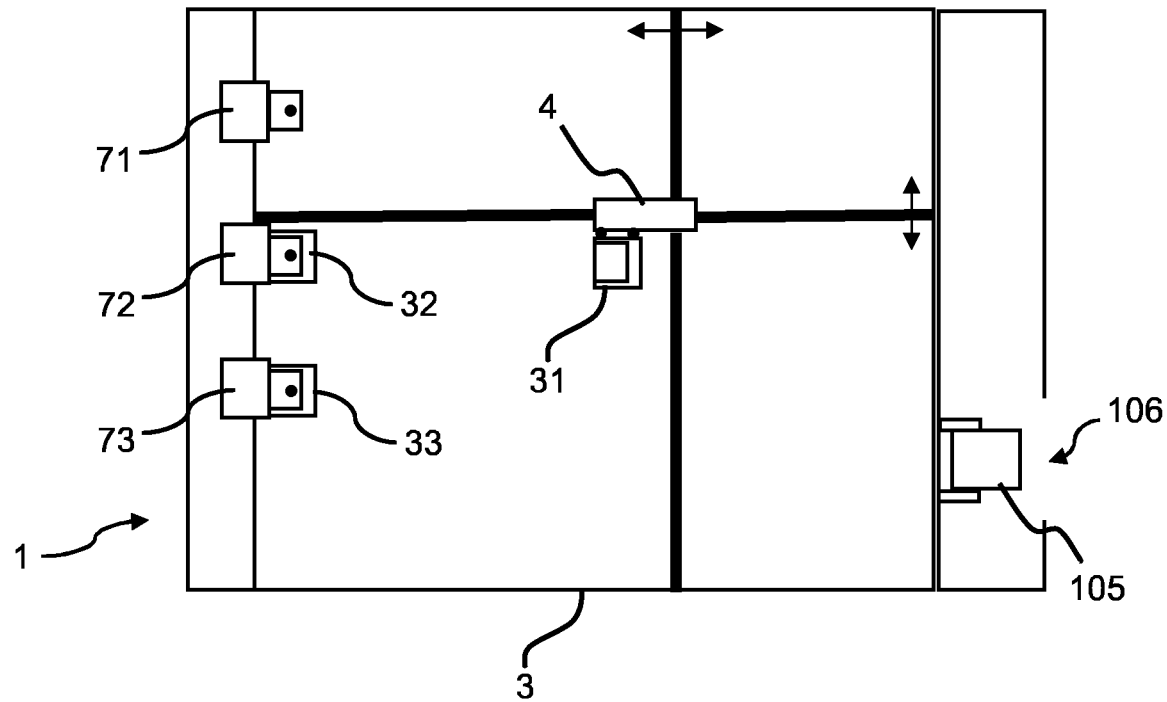
FIG. 12 shows a top view of the FFF system having three filament docks arranged at a back side of the system.

The FFF system 1 may comprise a print head exchange dock 105 as shown in FIG. 12 which is arranged to connect to the selected print head 31, remove the selected print head from the print head mount 4, and to present the selected print head 31 to a user for removal of the selected print head 31 from the system 1. FIG. 12 shows a top view of the FFF system 1 having three filament docks 71, 72, 72 arranged at a back side of the system 1, whereas the print head exchange dock 105 is arranged at an opposing side. In this embodiment, the system 1 comprises a housing 3 enclosing the build space 102 and the printhead exchange dock 105. The housing 3 comprises an opening 106 for external access to the printhead exchange dock 105. In this way a user can load and unload a print head from the print head exchange dock 105. In an embodiment, the print head exchange dock 105 can have a second function wherein it also functions as a print head dock for parking a print head without an intermediate filament module. In that case there is no need for the print head dock 8 shown in FIGS. 1 and 2, which will leave room for arranging an additional filament dock if requested.

The printhead exchange dock 105 may be lifted by means of a lifting module 107 and placed into the print head mount 4, see FIG. 13 which shows a schematic side view of part of the FFF system 1 according to an embodiment.

FIG. 14 schematically shows a side view of an assembly of a print head 31 attached to the print head exchange dock 105. The print head exchange dock 105 is arranged to slidably receive the print head 31 from a direction indicated by arrow 141. For this purpose, the print head 31 may have a cross section as shown in FIGS. 4B, 5A and 5B. It is noted that in the print head 31 in FIG. 14 does not contain a stopper such as the ridge 82 shown in FIG. 4B.

A pivotable blocking lever 142 is arranged to block the movement of the print head 31 in order to avoid the user from pushing the print head too far into the FFF system. The pivotable blocking lever 142 may be pivotable around a pivot point 143 which may be coupled to the print head exchange dock 105 or an interfacing structure (not shown). In this embodiment, the print head 31 comprises a biased locking pin 144 which locks into a recess arranged in the print head exchange dock 105. The locking pin 144 is arranged and biased in such a manner that the user can easily remove the print head 31 from the print head exchange dock 105. To enable ergonomic unlocking, the pin 144 may have a rounded top, but other forms are possible as long as it enables unlocking of the print head 31.

Once the print head 31 is docked into the print head exchange dock 105 for use in the FFF system, the print head 31 can be picked up by the print head mount 4, see FIG. 15 in which an arrow 146 indicates the movement of the print head 31 into the build volume 102. Before the print head 31 can be moved through the build volume 102 by the gantry, the blocking lever 142 is pivoted so as to free the print head 31. Pivoting of the blocking lever 142 can be performed using an activation mechanism such as an electrical driver (not shown), or it may be activated in a mechanical way during the lowering of the print head 31 in the build chamber by the lifting mechanism 107 shown in FIG. 13.

FIG. 16 shows a top view of the FFF system 1 according to a further embodiment. In this embodiment the print head mount 4 is manoeuvred by means of a rail system with two static rails 161, 162 and one moving rail 163. The rail system or gantry is arranged to move the print head 31 in an X-direction and a Y-direction relative to a build plate 2.

FIG. 17 shows a flow chart of a method 170 of fused filament fabrication according to an embodiment of the invention. The method comprises a step 171 of providing a fused filament fabrication system according to any one of the preceding claims, a step 172 of placing the print heads and the filament modules in the corresponding filament docks, a step 173 of feeding one or more filaments to the filament modules by means of the filament feeders, a step 174 of moving the gantry so that the print head mount is able to mount with a selected print head, and a step 175 of testing if the filament module that is attached to the selected print head is fed with a wanted filament. If this is the case, then the following steps are performed; locking 176 the selected print head to the attached filament module, and taking 177 the selected print head with the attached filament module from the filament dock, so as to be able to start a print task.

If it is decided from the testing step 175 that the filament module that is attached to the selected print head is not fed with a wanted filament, then the following steps are performed:

- unlocking 178 the selected print head from the attached filament module;
- placing 179 the selected print head into the print head dock;
- taking 180 the print head that is currently attached to the filament module having the wanted filament, and placing that print head into a filament dock without a docked print head;
- placing 181 the selected print head into the filament dock with the filament module having the wanted filament;
- locking 182 the selected print head to the filament module having the wanted filament,
- taking 183 the selected print head with the attached filament module from the filament dock, so as to be able to start a print task.

The present invention has been described above with reference to a number of exemplary embodiments as shown in the drawings. Modifications and alternative implementations of some parts or elements are possible, and are included in the scope of protection as defined in the appended claims. It should be noted that the above-mentioned embodiments illustrate rather than limit the invention, and that those skilled in the art will be able to design many alternative embodiments. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The mere fact that certain measures are recited in mutually different dependent claims does not indicate that a combination of these measures cannot be used to advantage.

The invention claimed is:

1. A fused filament fabrication system comprising:
    a build surface;
    a number of print heads, each print head comprising an extrusion channel and a nozzle at the end of the extrusion channel;
    a print head mount arranged for releasable connection with any of the print heads;
    a gantry arranged to move the print head mount relative to the build surface in an X, Y and Z direction;
    a number of filament modules each of which comprises a filament channel for passing through of a filament and is arranged to be releasably connected to a respective one of the print heads, wherein in a connected configuration, the filament channel is aligned with the extrusion channel;
    a number of filament docks each of which is arranged for docking one of the filament modules;
    a print head dock arranged for docking any of the print heads;
    a number of filament feeders, each of the filament feeders being connected via a Bowden tube to a respective one of the filament modules and configured for feeding the filament to the respective one of the filament modules;
    a control system arranged to control the gantry so as to select one print head from the number of print heads, to obtain a selected print head,
    wherein each of the print heads can be docked in the print head dock, and alternatively, via one of the filament modules, in any of the filament docks,
    wherein, starting from a parking state in which the selected print head is docked in one of the filament docks via a currently attached filament module,
        the selected print head together with the currently attached filament module can be separated from the filament dock by way of locking the selected print head to the currently attached filament module, by coupling the selected print head to the print head mount, and by then moving the selected print head away from its corresponding filament dock, or
        the selected print head can be separated from the currently attached filament module by way of unlocking the selected print head from the currently attached filament module, by coupling the selected print head to the print head mount, and by then moving the selected print head away from its corresponding filament dock.

2. The fused filament fabrication system according to claim 1, wherein the selected print head gets locked to the currently attached filament module by a filament fed through the currently attached filament module and at least partially into the extrusion channel of the selected print head.

3. The fused filament fabrication system according to claim 1, wherein the selected print head gets locked to the currently attached filament module by way of a locking mechanism arranged in each of the filament modules and/or each of the print heads.

4. The fused filament fabrication system according to claim 1, wherein the number of the filament modules is equal to the number of filament docks.

5. The fused filament fabrication system according to claim 1, wherein the number of print heads is equal to the number of filament docks.

6. The fused filament fabrication system according to claim 1, wherein the print head dock comprises a further filament dock and a further filament module.

7. The fused filament fabrication system according to claim 1, wherein the system comprises a print head exchange dock arranged to connect to the selected print head, remove the selected print head from the print head mount, and to present the selected print head to a user for removal of the selected print head from the system.

8. The fused filament fabrication system according to claim 1, wherein each of the filament modules is provided with a print head power supply cable, and wherein each filament module comprises a releasable electrical connection to provide power to a connected print head.

9. The fused filament fabrication system according to claim 1, wherein each of the print heads comprises a recess arranged to slidably receive one of the filament modules.

10. The fused filament fabrication system according to claim 1, wherein the system comprises a number of lifting modules, each being arranged to lift one of the filament docks or the print head dock.

11. The fused filament fabrication system according to claim 1, wherein nozzles of at least two of the print heads have different nozzle outlet diameters.

12. The fused filament fabrication system according to claim 1, wherein at least one of the print heads comprises a further filament feeder.

13. The fused filament fabrication system according to claim 1, wherein at least one of the filament modules comprises a further filament feeder.

14. A method of fused filament fabrication, the method comprising:
- providing the fused filament fabrication system according to claim 1;
- placing the print heads and the filament modules in the corresponding filament docks;
- feeding one or more filaments to the filament modules by means of the filament feeders;
- moving the gantry so that the print head mount is able to mount with a selected print head, wherein, if the filament module that is attached to the selected print head is fed with a wanted filament, the method further comprises:
- locking the selected print head to the attached filament module; and
- taking the selected print head with the attached filament module from the filament dock, or wherein, if the filament module that is not attached to the selected print head is fed with a wanted filament, the method further comprises:
- unlocking the selected print head from the attached filament module;
- placing the selected print head into the print head dock;
- taking the print head that is currently attached to the filament module having the wanted filament, and placing that print head into a filament dock without a docked print head;
- placing the selected print head into the filament dock with the filament module having the wanted filament;
- locking the selected print head to the filament module having the wanted filament, and
- taking the selected print head with the attached filament module from the filament dock.

* * * * *